(12) United States Patent
Baba et al.

(10) Patent No.: US 7,639,312 B2
(45) Date of Patent: Dec. 29, 2009

(54) APPARATUS AND METHOD FOR PROCESSING MOVING PICTURE, AND COMPUTER PROGRAM PRODUCT

(75) Inventors: Masahiro Baba, Tokyo (JP); Go Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 612 days.

(21) Appl. No.: 11/211,721

(22) Filed: Aug. 26, 2005

(65) Prior Publication Data

US 2006/0066554 A1 Mar. 30, 2006

(30) Foreign Application Priority Data

Sep. 29, 2004 (JP) ............................. 2004-285488

(51) Int. Cl.
H04N 5/208 (2006.01)
H04N 3/14 (2006.01)
G09G 3/36 (2006.01)
G09G 5/10 (2006.01)
G06K 9/40 (2006.01)

(52) U.S. Cl. .................... 348/790; 348/252; 345/89; 345/98; 345/690; 382/199; 382/266

(58) Field of Classification Search ................. 348/252, 348/790; 345/89, 98, 690; 382/199, 266
See application file for complete search history.

(56) References Cited

U.S. PATENT DOCUMENTS

| 5,852,475 | A | * | 12/1998 | Gupta et al. ................. 348/606 |
| 5,920,356 | A | * | 7/1999 | Gupta et al. ................. 348/606 |
| 6,930,752 | B2 | | 8/2005 | Baba et al. |
| 6,967,641 | B1 | * | 11/2005 | Macellin-Dibon .......... 345/109 |
| 7,038,651 | B2 | * | 5/2006 | Nitta et al. .................... 345/98 |
| 7,158,107 | B2 | * | 1/2007 | Kawabe et al. ................ 345/89 |

(Continued)

FOREIGN PATENT DOCUMENTS

JP 6-13270 1/1994

(Continued)

OTHER PUBLICATIONS

K. Nakanishi et al., "Fast Response 15-in. XGA TFT-LCD with Feedforward Driving (FFD) Technology for Multimedia Applications," SID 01 Digest (2001), pp. 488-491.

(Continued)

*Primary Examiner*—Brian P Yenke
(74) *Attorney, Agent, or Firm*—Finnegan, Henderson, Farabow, Garrett & Dunner, L.L.P.

(57) ABSTRACT

A method of processing a moving picture includes determining, based on a pixel value at a predetermined position in a first frame included in a moving picture, a pixel value at a corresponding position to the predetermined position in a second frame which is subsequent to the first frame in the moving picture, and a degree of response delay caused at a display of the moving picture by a liquid crystal display, an output value for an output of a picture at the predetermined position in the second frame. The method further includes detecting an edge area from the second frame; and correcting the output value for the edge area so that an absolute difference between the output value for the edge area and a current output value is larger by a predetermined first correction amount.

32 Claims, 13 Drawing Sheets

U.S. PATENT DOCUMENTS

| | | | |
|---|---|---|---|
| 7,259,794 B2 * | 8/2007 | Chang et al. | 348/452 |
| 7,345,712 B2 * | 3/2008 | Sohn | 348/671 |
| 7,345,713 B2 * | 3/2008 | Arai et al. | 348/687 |
| 7,382,414 B2 * | 6/2008 | Nakajima et al. | 348/625 |
| 7,405,741 B1 * | 7/2008 | Zhang et al. | 345/690 |
| 2001/0024181 A1 * | 9/2001 | Kubota et al. | 345/87 |
| 2002/0024481 A1 * | 2/2002 | Kawabe et al. | 345/87 |
| 2003/0132901 A1 * | 7/2003 | Shimada | 345/87 |
| 2003/0174110 A1 | 9/2003 | Baba et al. | |
| 2004/0061675 A1 * | 4/2004 | Hirakawa et al. | 345/88 |
| 2005/0068343 A1 * | 3/2005 | Pan et al. | 345/690 |
| 2006/0022926 A1 * | 2/2006 | Mizumaki et al. | 345/89 |
| 2006/0280249 A1 * | 12/2006 | Poon | 375/240.16 |

FOREIGN PATENT DOCUMENTS

| | | |
|---|---|---|
| JP | 10-191326 | 7/1998 |
| JP | 11-238138 | 8/1999 |
| JP | 2002-82657 | 3/2002 |
| JP | 2003-50574 | 2/2003 |
| JP | 2004-80252 | 3/2004 |
| JP | 2004-139097 | 5/2004 |
| JP | 2004-264725 | 9/2004 |
| JP | 2005-43864 | 2/2005 |
| JP | 2003-264846 | 4/2005 |

OTHER PUBLICATIONS

Office Action from Japanese Patent Office, mailed Jun. 16, 2009, Partial.

* cited by examiner

TONE $L_0$ OF INPUT VIDEO INFORMATION

|  | 0 | 1 | 2 | 15 | 253 | 254 | 255 |
|---|---|---|---|---|---|---|---|
| 0 | 0 | 0 | 0 | 0 | 0 | 0 | 0 |
| 1 | 3 | 4 | 4 | 0 | 0 | 0 | 0 |
| 120 | 150 | 149 | 148 | 140 | 100 | 98 | 97 |
| 253 | 255 | 255 | 255 | 255 | 255 | 255 | 255 |
| 254 | 255 | 255 | 255 | 255 | 255 | 255 | 255 |
| 255 | 255 | 255 | 255 | 255 | 255 | 255 | 255 |

TONE $L_1$ OF ONE FRAME-DELAYED VIDEO INFORMATION

INITIAL ENHANCED TONE $L_e$ AT $L_0=15$ AND $L_1=120$

ENHANCEMENT CORRECTION FACTOR β

β max

1

0        255   EDGE INTENSITY I

APPARATUS AND METHOD FOR PROCESSING MOVING PICTURE, AND COMPUTER PROGRAM PRODUCT

CROSS-REFERENCE TO RELATED APPLICATIONS

This application is based upon and claims the benefit of priority from the priority Japanese Patent Application No. 2004-285488, filed on Sep. 29, 2004; the entire contents of which are incorporated herein by reference.

BACKGROUND OF THE INVENTION

1. Field of the Invention

The present invention relates to a method of processing a moving picture displayed on a liquid crystal display, a moving picture processing apparatus, and a computer program product therefore.

2. Description of the Related Art

In recent years, liquid crystal displays come to be utilized in a wide variety of fields, for example, as displays for personal computers (PC), notebook type PCs, and televisions. And opportunities to view moving pictures on liquid crystal displays have been increasing.

On the liquid crystal display which response speed is not sufficiently high, however, image degradation such as blurring and afterimage occurs at the moving picture display. In general a refresh rate of the liquid crystal display is 60 Hz (hertz). Hence, a response speed of equal to or less than 16.7 milliseconds (ms) is desirable for an appropriate display of moving pictures.

On recent liquid crystal displays, the response speed required for the transition between digital values (from 0 gray-scale level to 255 gray-scale level, or from 255 gray-scale level to 0 gray-scale level on a 256-gray-scale level liquid crystal display) is equal to or faster than 16.7 ms. However, the response speed for a transition between intermediate gray-scale levels is equal to or slower than 16.7 ms.

In general, since moving pictures have a large number of intermediate gray-scale levels, the insufficient response speed for the transition between intermediate gray-scale levels incurs degradation of moving picture quality. Hence, further improvement in the response speed is required.

To achieve higher response speed in liquid crystal displays, various efforts have been made, for example, development of novel materials for liquid crystal with higher response speed, and improvement of driving method of liquid crystal displays fabricated with the conventional liquid crystal materials. Such novel materials for liquid crystal are, for example, smectic ferroelectric liquid crystal and antiferroelectric liquid crystal.

There still remain various problems to be solved, for example, an image sticking caused by the effect of spontaneous polarization of the liquid crystal material, and sensitivity of liquid crystal orientation towards pressure or the like.

On the other hand, some methods to improve the response speed of the liquid crystal display through the improvement of driving method of liquid crystal display fabricated with the conventional liquid crystal material. For example, 2001 SID International Symposium Digest of Technical Papers/Volume XXXII/ISSN-0001-966x, p. 488 discloses a method to increase gray-scale level as appropriate at the writing of the gray-scale level into the liquid crystal display so as to properly handle the change of the gray-scale level on the display.

Alternatively, edge enhancement can be applied to increase the spatial sharpness of pictures. The edge enhancement is a technique to increase the sharpness of the picture by amplifying a spatial derivative (generally, the spatial derivative is a difference between pixel values of adjacent pixels, since the picture is consisted from non-continuous data) of the picture.

The edge enhancement in general, however, increases the sharpness of the picture depending only on the information on spatial direction of the picture. Hence, the effect of the edge enhancement is insufficient when applied on the moving picture. More specifically, when the viewer focuses his/her attention on an area with a motion in the moving picture, the point of regard moves toward the direction of motion, and an apparent contrast to the viewer is decreased.

A general image capturing system captures the image by integrating light supplied during a predetermined time period. Hence, when a moving object is a target of image capture, the integration is performed on a spatially shifted position. Thus, so-called "blurring at image capture" occurs to decrease the contrast of the moving picture compared with the contrast of the still picture.

Further in a liquid crystal apparatus, since the moving picture is continuously displayed as a still picture for one frame period, so-called "hold blurring" occurs to decrease the contrast of the moving picture.

Thus, when the general edge enhancement is applied on a moving picture including a still area and a moving area, apparent sharpness is different in the still area and the moving area. Hence, subjective image quality is not improved as expected.

SUMMARY OF THE INVENTION

According to one aspect of the present invention, method of processing a moving picture includes determining, based on a pixel value at a predetermined position in a first frame included in a moving picture, a pixel value at a corresponding position to the predetermined position in a second frame which is subsequent to the first frame in the moving picture, and a degree of response delay caused at a display of the moving picture by a liquid crystal display, an output value for an output of a picture at the predetermined position in the second frame; detecting an edge area from the second frame; and correcting the output value for the edge area so that an absolute difference between the output value for the edge area and a current output value is larger by a predetermined first correction amount.

According to another aspect of the present invention, a moving picture processing apparatus includes an output value determining unit that determines, based on a pixel value at a predetermined position in a first frame included in a moving picture, a pixel value at a corresponding position to the predetermined position in a second frame which is subsequent to the first frame, and a degree of response delay caused at a display of the moving picture by a liquid crystal display, an output value for an output of a picture which is located at a predetermined position in the second frame; an edge area detecting unit that detects an edge area from the second frame; and an output value correcting unit that corrects the output value for the edge area so that an absolute difference between the output value for the edge area and a current output value is larger by a predetermined first correction amount.

According to still another aspect of the present invention, a computer program product causes a computer to perform the method according to the present invention.

DETAILED DESCRIPTION OF THE PREFERRED EMBODIMENTS

Hereinbelow, exemplary embodiments of a method of processing a moving picture, a moving picture processing apparatus, and a computer program product for processing a moving picture according to the present invention are described in detail with reference to the accompanying drawings. It should be noted that the present invention is not limited by the embodiments.

Figure 1:
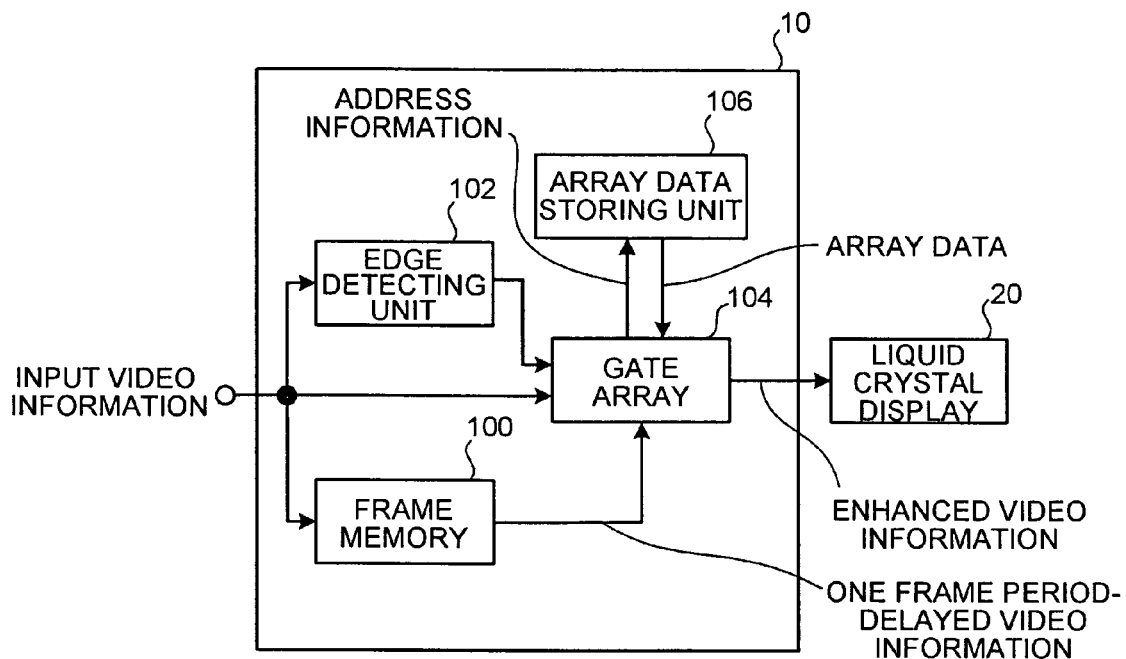
FIG. 1 is a block diagram of a functional structure of a moving picture processing apparatus which employs a method of processing a moving picture according to a first embodiment of the present invention.

FIG. 1 is a block diagram of a functional structure of a moving picture processing apparatus 10 which employs a method of processing a moving picture according to the present invention. The moving picture processing apparatus 10 includes a frame memory 100, an edge detecting unit 102, a gate array 104, and a array data storing unit 106. When video information is displayed on a liquid crystal display 20, an image quality of the video is degraded due to a response delay. Enhancement of the gray-scale level difference is required to eliminate such an undesirable effect. The moving picture processing apparatus 100 determines an enhanced gray-scale level which is an enhanced gray-scale level to be supplied to the liquid crystal display 20 as an output.

The input video information is sent to the frame memory 100, the edge detecting unit 102, and the gate array 104. The frame memory 100 stores the supplied video information for one frame period and outputs video information with one-frame period delay. For the determination of the enhanced gray-scale level of the video information for the display of the video information on the liquid crystal display 20, the gray-scale level of the input frame and the gray-scale level of the previous frame to the input frame need to be compared. Hereinbelow, for the convenience of the description, it is assumed that the frame memory 100 is currently storing a first frame and a second frame which is subsequent to the first frame is to be supplied as an input from outside.

The edge detecting unit 102 detects an edge from the second frame, and supplies the detected picture as an edge-detected picture to the gate array 104. Various methods may be employed to detect the edge. In the embodiments, Sobel differential operator is employed.

The edge detection by the Sobel differential operator is represented by Expressions (1) to (3):

$$I(x, y) = \sqrt{E_x(x, y)^2 + E_y(x, y)^2} \quad (1)$$

$$E_x(x, y) = H_x * P_x(x, y) \quad H_x = \begin{bmatrix} -1 & 0 & 1 \\ -2 & 0 & 2 \\ -1 & 0 & 1 \end{bmatrix} \quad (2)$$

$$E_y(x, y) = H_y * P_y(x, y) \quad H_y = \begin{bmatrix} -1 & -2 & -1 \\ 0 & 0 & 0 \\ 1 & 2 & 1 \end{bmatrix} \quad (3)$$

Here, I(x,y) indicates edge intensity at a coordinate position (x,y) of the picture. $E_x(x,y)$ indicates a density gradient in a horizontal direction of a pixel $P_x(x,y)$ on the coordinate position (x,y). $E_y(x,y)$ indicates a density gradient in a vertical direction of a pixel $P_y(x,y)$ on the coordinate position (x,y). $H_x$ and $H_y$ are differential operators in the horizontal direction and in the vertical direction, respectively. The symbol * represents an operation of convolution. I(x,y) may take a value equal to or larger than 255 (8 bits), but is rounded to a value not more than 255 by saturate calculation.

Though the edge detection is performed with the Sobel differential operator in the first embodiment, a differential only in the horizontal direction may be found, for example, to alleviate the processing load. In general, a large part of images included in a captured moving picture move in the horizontal direction, and hence, edge detection for the horizontal direction alone brings about a sufficient result.

In the first embodiment, the edge-detected picture is found for each of input gray-scale levels, i.e., red, green, and blue. Alternatively, a luminance component may be found for each of red, green, and blue, and the edge-detected picture is obtained from each luminance component alone. Further, when the video information is consisted of luminance information and color-difference information (Y, U, V, for example) as in a decoding result of a moving picture in MPEG2 (Moving Picture Experts Group 2), the edge-detected picture may be found based on the luminance information (Y), and the color-difference information (U, V) is output as it is. In this case, since only the luminance component is to be stored for the first frame, the size of the frame memory is reduced. In addition, since the edge enhancement is performed on only the luminance component, processing cost is reduced.

The array data storing unit 106 stores data on initial enhanced gray-scale levels in a look-up table (LUT). The data on initial enhanced gray-scale levels is described with reference to FIG. 2.

Assume that the gray-scale level changes from $L_0$ in the first frame to $L_1$ in the second frame. Then, even if the gray-scale level $L_1$ is written in for the display of the second frame on the liquid crystal display 20, the level of the gray-scale level $L_1$ cannot be attained in one frame period (1/60 seconds in general) due to the response delay of the liquid crystal display 20.

Figure 2:
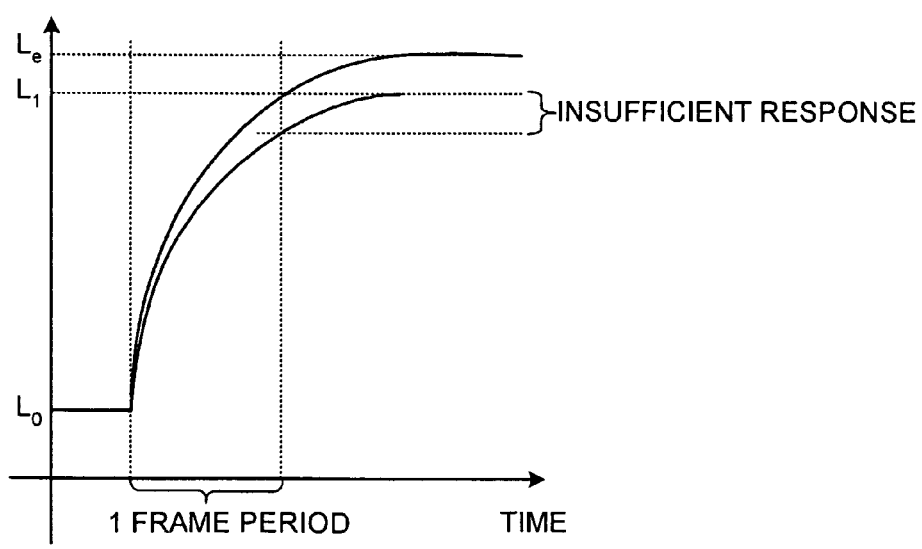
FIG. 2 is a schematic graph of a relation among a gray-scale level $L_0$ in a first frame, a gray-scale level $L_1$ in a second frame, and an initial enhanced gray-scale level $L_e$.

Hence, in place of $L_1$, a gray-scale level $L_e$ is written. Thus, the level of $L_1$ can be attained in one frame period. This gray-scale level level $L_e$ is called the initial enhanced gray-scale level. FIG. 2 schematically shows a relation among the gray-scale level $L_0$ of the first frame, the gray-scale level $L_1$ of the second frame, and the initial enhanced gray-scale level $L_e$. When a written gray-scale level is of a higher level than the level of the gray-scale level $L_1$, the level of gray-scale level $L_1$ can be achieved in one frame period. This written gray-scale level is $L_e$.

In addition, $L_1-L_0$, $L_e-L_1$, and $L_e-L_0$ in the embodiments correspond to a "first difference value", a "second difference value", and a "third difference value", respectively.

Thus, when the initial enhanced gray-scale level $L_e$ of a level that enables the attainment of the level of $L_1$ in one frame period is written in, the target level $L_1$ can be achieved in one frame period. Then, an apparent response speed of the liquid crystal display 20 can be improved.

Figures 3, 4:
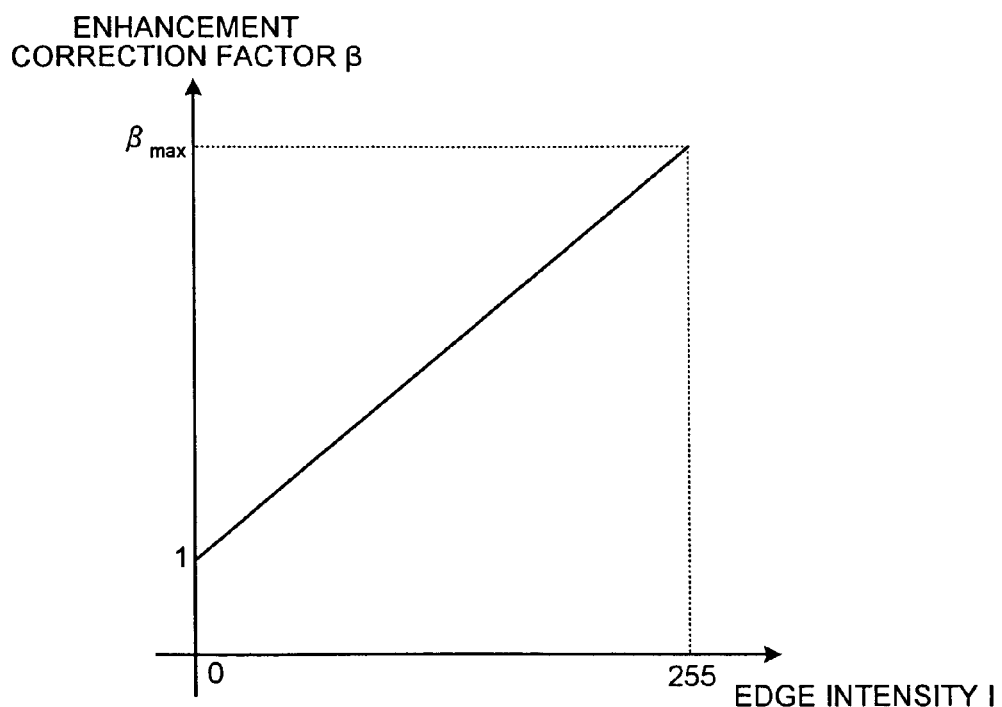
FIG. 3 is a schematic diagram of data structure of a look up table in a array data storing unit.
FIG. 4 is a graph of a relation between an edge intensity I in an edge area detected by an edge detecting unit and an enhancement correction factor $\beta$.

The array data storing unit 106 stores the initial enhanced gray-scale levels $L_e$ corresponding to all transitions between predetermined different gray-scale levels or corresponding to the transitions between some predetermined gray-scale levels. FIG. 3 schematically shows a data structure of the LUT in the array data storing unit 106. The LUT is arranged as a two-dimensional matrix with the horizontal axis representing $L_0$ and the vertical axis representing $L_1$. In a cell located at a crossing point of the $L_0$ row and the $L_1$ column, a corresponding $L_e$ is stored.

The manner of storing the gray-scale level $L_e$ is not limited by the first embodiment. Any storage manner is adoptable as far as the gray-scale level $L_e$ can be identified based on the inputs of the gray-scale level $L_0$ and the gray-scale level $L_1$. For example, the gray-scale level $L_e$ may be stored one-dimensionally.

The LUT does not need to store the gray-scale levels $L_e$ corresponding to all transitions between all gray-scale levels. The LUT may store only the gray-scale levels $L_e$ corresponding to the gray-scale level $L_0$ and the gray-scale level $L_1$ of every four level, for example. Then, the gray-scale level $L_e$ for the gray-scale level $L_0$ and the gray-scale level $L_1$ which are not stored in the LUT is found based on the linear interpolation or the like. Thus, the size of the LUT can be reduced, and the memory capacity can be saved.

Though the LUT shown in FIG. 3 stores the initial enhanced gray-scale levels $L_e$, the LUT may store only the amount of enhancement, i.e., the difference between the gray-scale level $L_e$ and the gray-scale level $L_1$. Then, the addition of the amount of enhancement stored in the LUT and the gray-scale level $L_1$ may be performed in the gate array 104 or the like described later to find the gray-scale level $L_e$.

The array data storing unit 106 can be any data storage such as a read only memory (ROM), or a random access memory (RAM).

The gate array 104 acquires the second frame from the outside and the first frame from the frame memory 100. The gate array 104 using the gray-scale level $L_0$ of the acquired first frame and the gray-scale level $L_1$ of the second frame as address information, to acquire a corresponding initial enhanced gray-scale level $L_e$ from the array data storing unit 106.

Thus, the gate array 104 can determine the initial enhanced gray-scale level $L_e$ according to the LUT in the array data storing unit 106. The LUT is formulated based on a pixel value at a predetermined location in the first frame, a pixel value at a corresponding location in the second frame, and a degree of the response delay.

The gate array 104 further acquires an edge-detected picture of the second frame from the edge detecting unit 102. The gate array 104 performs further enhancement of a predetermine amount to the initial enhanced gray-scale level $L_e$ based on the edge intensity of the edge-detected picture, to generate the enhanced gray-scale level actually written into the liquid crystal display 20. Specifically, the gate array 104 performs edge enhancement which gives a further enhancement of the gray-scale level in an edge area of a moving object, i.e., an edge area where there is a change between frames. Then, the gate array 104 supplies the processed data as enhanced video information together with a timing signal (clock, horizontal synchronization signal, a vertical synchronization signal, or the like) of the liquid crystal display 20.

Next, the edge enhancement performed by the gate array 104 on the edge-detected picture is described. When an enhancement correction factor based on the edge intensity of the edge-detected picture is denoted by $\beta$, and the enhanced gray-scale level to be eventually written into the liquid crystal display 20 is denoted as $L_c$, the value of $L_c$ can be found according to Expression (4):

$$L_c = \beta(L_e - L_1) + L_1 \qquad (4)$$

Next, a manner to find the enhancement correction factor $\beta$ is described. FIG. 4 shows a relation between the edge intensity I of the edge area detected by the edge detecting unit 102 and the enhancement correction factor $\beta$. In the first embodiment, the enhancement correction factor $\beta$ increases in direct proportion to the edge intensity I as shown in FIG. 4. Hence, the enhancement correction factor $\beta$ can be found from the edge intensity I according to Expression (5):

$$\beta = \frac{\beta_{max} - 1}{255} \times I + 1 \qquad (5)$$

where $\beta_{max}$ is a maximum enhancement correction factor in the case that the edge intensity takes a maximum value. The value of $\beta_{max}$ can be determined by the user at his/her discretion. In FIG. 4, the maximum value of the edge intensity is set to 255. The edge intensity I is a value found based on Expressions (1) to (3), and represents the edge intensity of the picture of the input video as 8-bit information. As can be seen from the above, the enhancement correction factor $\beta$ is a value in direct proportion to the edge intensity.

Figure 5:
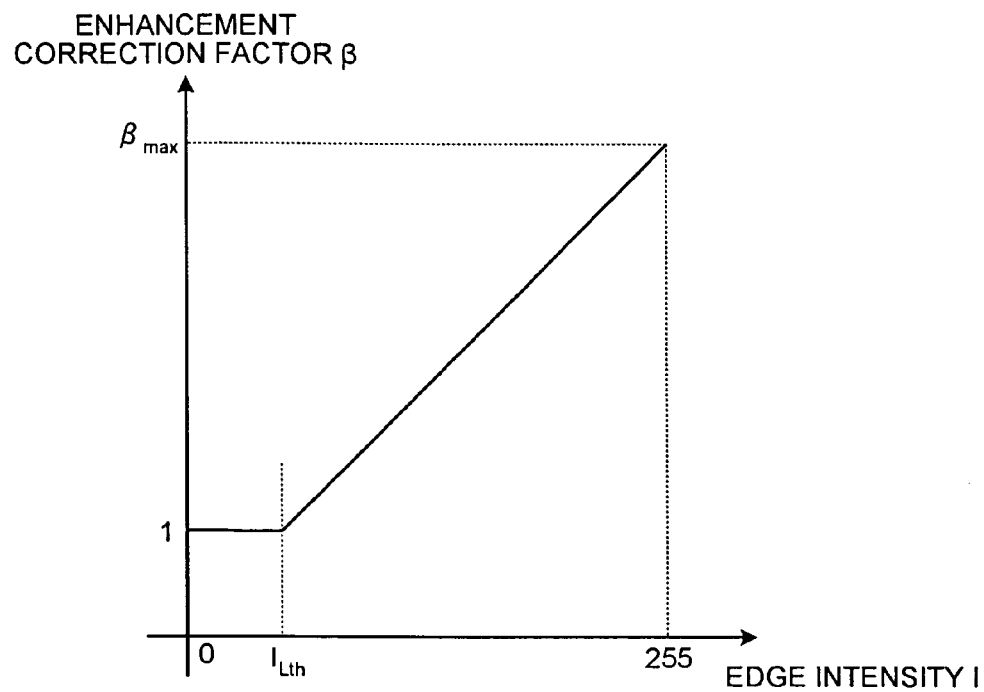
FIG. 5 is a graph of another example of the relation between the edge intensity I in the edge area detected by the edge detecting unit 102 and the enhancement correction factor $\beta$.

Though the enhancement correction factor $\beta$ is determined based on the relation of FIG. 4 in the first embodiment, the enhancement correction factor $\beta$ may be determined based on other relation. FIG. 5 shows one of such relations between the enhancement correction factor $\beta$ and the edge intensity I. As shown in FIG. 5, when the edge intensity I is low, the enhancement correction factor is set to one. In other words, over-enhancement is not performed. Then, the enhancement correction factor $\beta$ can be found according to Expression (6):

$$\beta = \begin{cases} \frac{\beta_{max} - 1}{255 - I_{Lth}} \times (I - I_{Lth}) + 1 & (I \geq I_{Lth}) \\ 1 & (I < I_{Lth}) \end{cases} \qquad (6)$$

where $I_{Lth}$ represents a threshold of the edge intensity for the increase in the enhancement correction factor.

When the enhancement correction factor $\beta$ is determined based on the relation between the edge intensity I and the enhancement correction factor $\beta$ shown in FIG. 5, over-enhancement of a noise can be prevented. Then, the enhancement of noise, and hence the degradation of image quality can be prevented.

Figure 6:
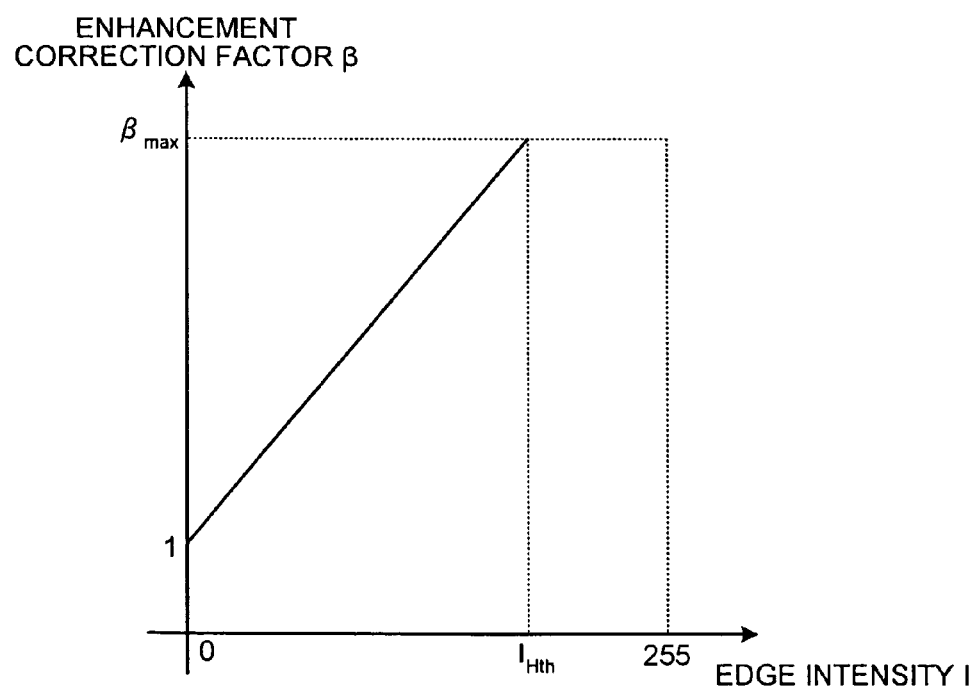
FIG. 6 is a graph of still another example of the relation between the edge intensity I in the edge area detected by the edge detecting unit and the enhancement correction factor $\beta$.

FIG. 6 shows another relation between the enhancement correction factor $\beta$ and the edge intensity I. As shown in FIG. 6, when the edge intensity is high, the enhancement correction factor $\beta$ is set to a fixed value, i.e., $\beta_{max}$. Then, the enhancement correction factor $\beta$ can be found according to Expression (7):

$$\beta = \begin{cases} \frac{\beta_{max} - 1}{I_{Hth}} \times I + 1 & (I < I_{Hth}) \\ \beta_{max} & (I \geq I_{Hth}) \end{cases} \qquad (7)$$

where $I_{Hth}$ is a threshold of the edge intensity for a fix setting of the enhancement correction factor.

When the enhancement correction factor $\beta$ is determined based on the relation of the edge intensity I and the enhancement correction factor $\beta$ shown in FIG. 6, an excessive over-enhancement at a high edge intensity I can be prevented.

Figure 7:
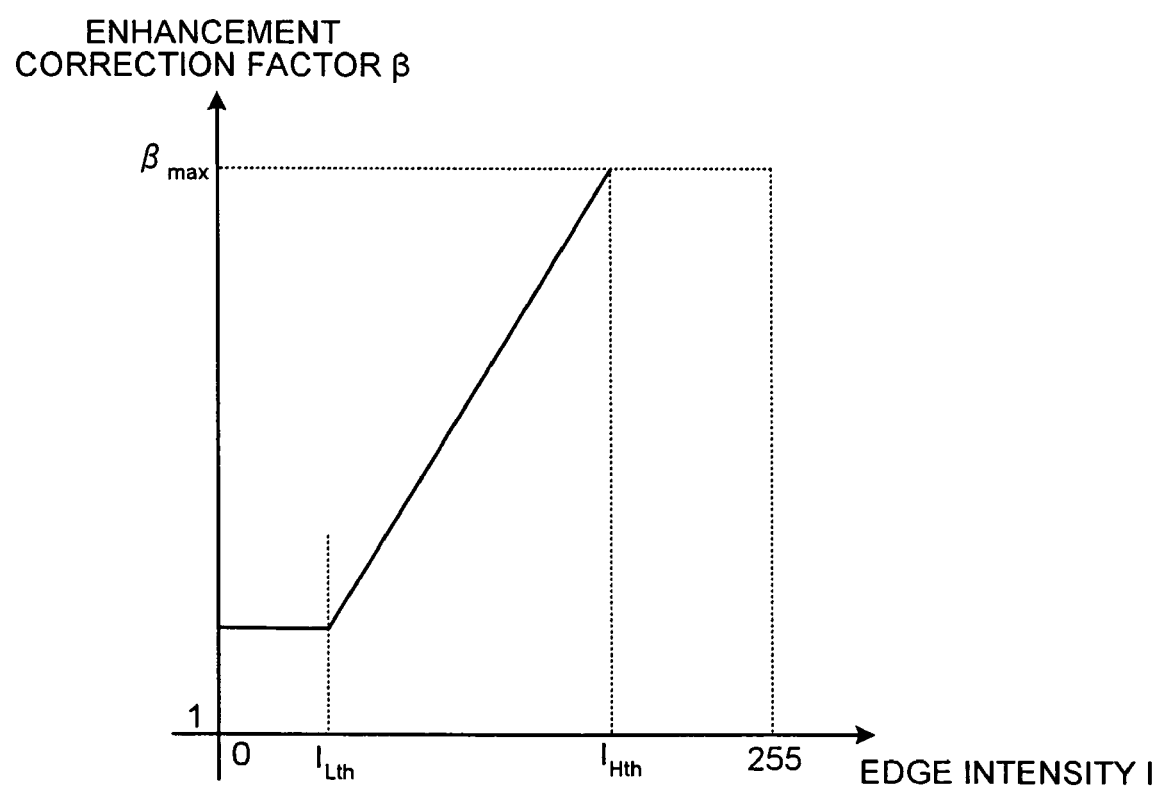
FIG. 7 is a graph of still another example of the relation between the edge intensity I in the edge area detected by the edge detecting unit and the enhancement correction factor $\beta$.

Still alternatively, the relations represented by Expressions (6) and (7) may be applied together. FIG. 7 shows a relation between the enhancement correction factor $\beta$ and the edge intensity I when the relations represented by Expressions (6) and (7) are applied together. Then, the enhancement correction factor $\beta$ can be found according to Expression (8):

$$\beta = \begin{cases} 1 & (I < I_{Lth}) \\ \frac{\beta_{max} - 1}{I_{Hth} - I_{Lth}} \times (I - I_{Lth}) + 1 & (I_{Lth} \leq I \leq I_{Hth}) \\ \beta_{max} & (I \geq I_{Hth}) \end{cases} \qquad (8)$$

Figure 8A:
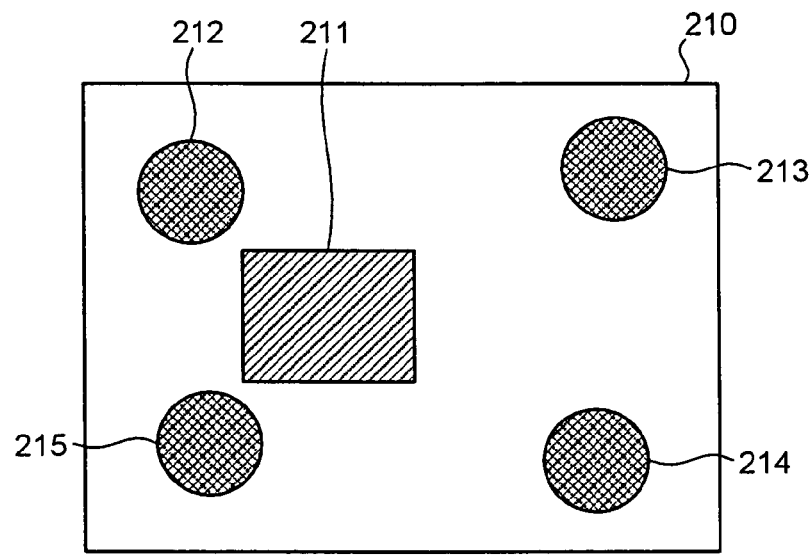
FIG. 8A is a diagram of an N frame.
Figure 8B:
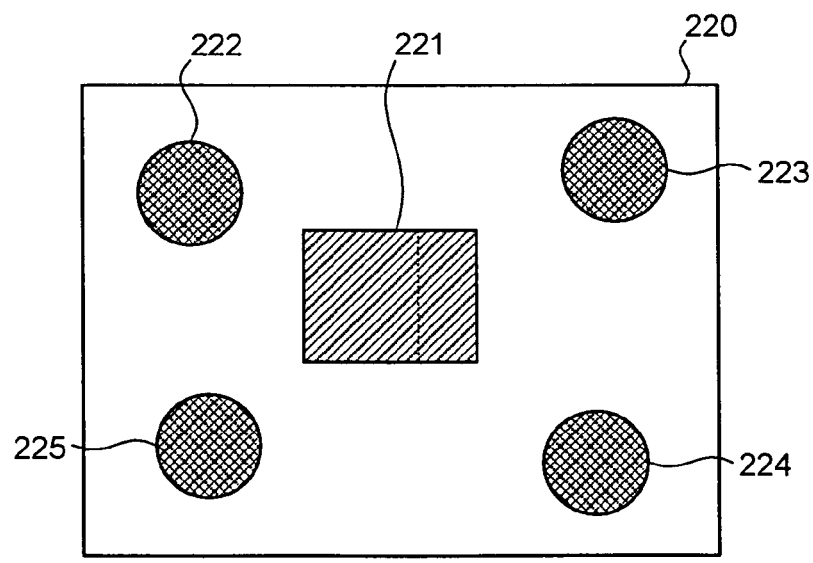
FIG. 8B is a diagram of an N+1 frame.

Next, a specific description is given on a processing of an N frame 210 shown in FIG. 8A and an N+1 frame 220 shown in FIG. 8B by the moving picture processing apparatus 10. The N frame 210 includes a rectangular object 211, and circular objects 212, 213, 214, and 215. The N+1 frame 220 includes a rectangular object 221, and circular objects 222, 223, 224, and 225 as shown in FIG. 8B similarly to the N frame 210. The rectangular object 211 is a moving object which moves in a horizontal direction in the frame at the transition from the N frame 210 to the N+1 frame 220. The circular objects 212-215 are still.

Figure 9:
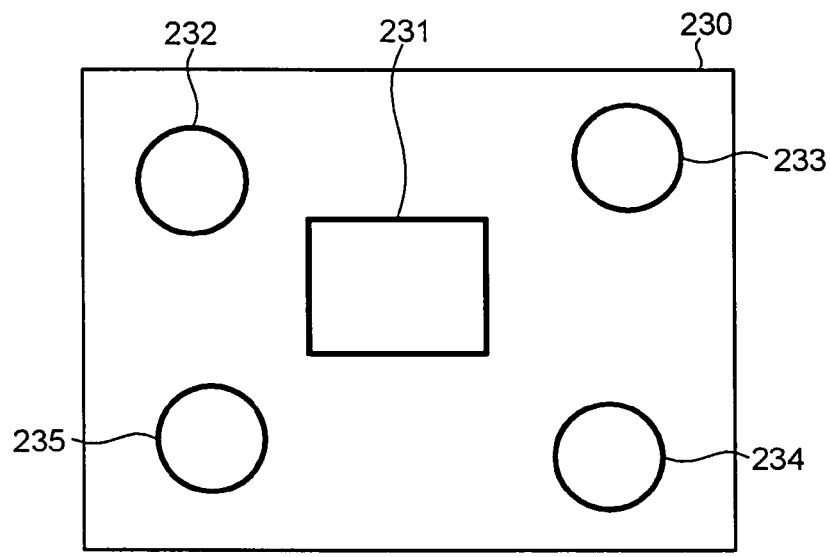
FIG. 9 is a diagram of an edge-detected picture obtained via detection of edge areas from the N+1 frame by the edge detecting unit.

FIG. 9 shows an edge-detected picture 230 obtained via the detection of edge areas from the N+1 frame 220 by the edge detecting unit 102. The edge detecting unit 102 detects edges of an entire input frame. Hence, the edge-detected picture 230 includes edge areas 232, 233, 234, and 235 corresponding to the still circular objects 222-224 and an edge area 231 corresponding to the rectangular object 221.

Figure 10:
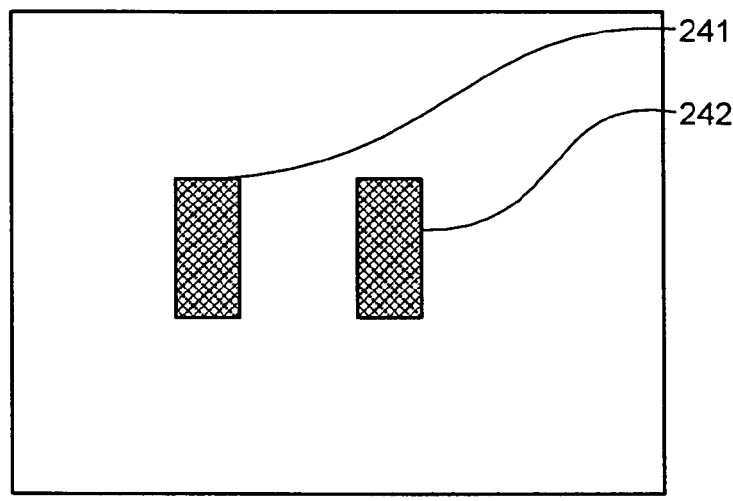
FIG. 10 is a diagram of a difference between absolute values of the N frame and the N+1 frame.

FIG. 10 shows a difference in absolute values of the N frame 220 and the N+1 frame 230. The rectangular objects 211 and 221 moves from the left to the right in the horizontal direction in the frame at the transition from the N frame 220 to the N+1 frame 230. Hence, differences 241, and 242 of the moving object and the background are produced on the right side and the left side of the rectangular objects 211 and 221.

In the first embodiment, the gate array 104 performs enhancement on the edge area detected by the edge detecting unit 102 as represented by Expression (4). However, when $L_e - L_1 = 0$ according to Expression (4), the relation $L_c = L_1$ is applied for any enhancement correction factor $\beta$, in other words, the gate array 104 does not perform enhancement on such $L_e$ and $L_1$.

As shown in FIG. 10, since the circular objects 222-225 are still in the N+1 frame 220, there is no inter-frame difference. Hence, for the circular objects 222-225, the relation $L_e = L_1$ holds, and $L_e - L_1 = 0$. Therefore, the gate array 104 does not perform enhancement on the circular objects 222-225.

Figure 11:
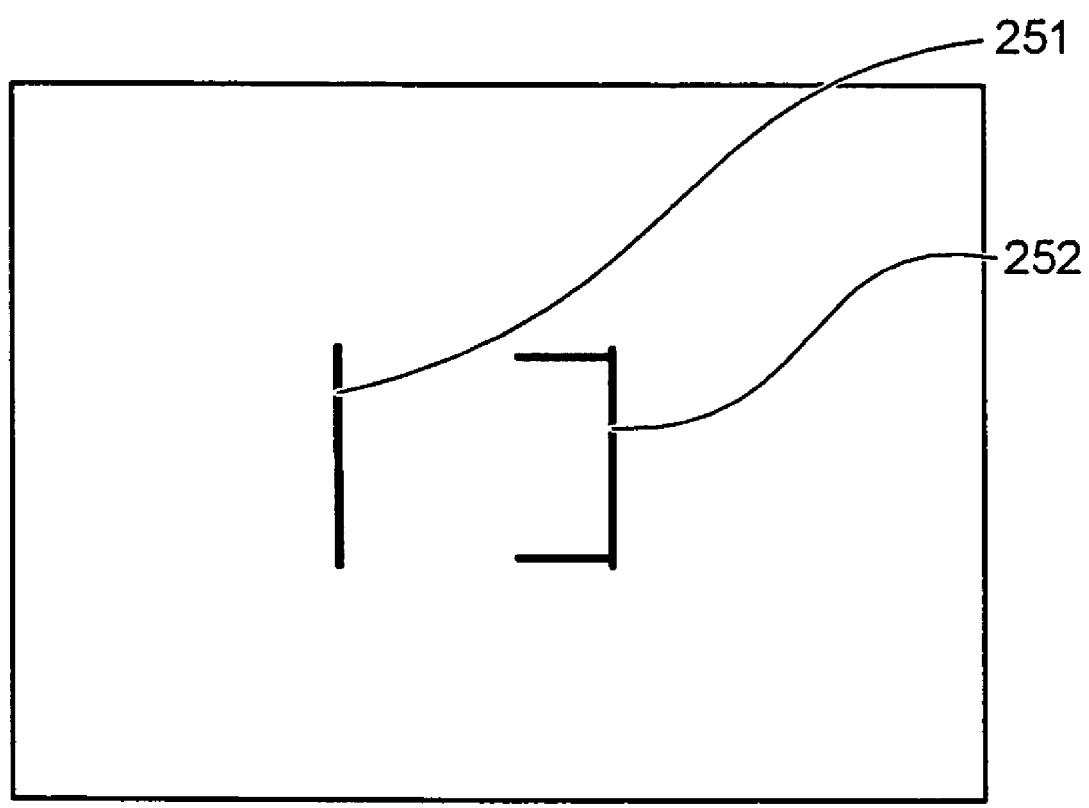
FIG. 11 is a diagram of an edge area and an edge area accompanying a motion and obtained via a logic AND operation of a digitized value of the edge-detected picture of the N+1 frame of FIG. 9 and a digitized value of the difference of absolute values of the N frame and the N+1 frame.

Thus, the gate array 104 performs enhancement only on an edge area with motion among the edge areas detected by the edge detecting unit 102. The edge area to which the gate array 104 performs enhancement, i.e., the edge area with motion can be represented by a logical product of a digitized value of the edge-detected picture of the N+1 frame shown in FIG. 9 and a digitized value of the difference in absolute values of the N frame 210 and the N+1 frame 220. FIG. 11 indicates edge areas 251 and 252 with motion which are obtained via the logical AND operation of the digitized value of the edge-detected picture of the N+1 frame shown in FIG. 9 and the digitized value of the difference in absolute values of the N frame 210 and the N+1 frame 220. The edge areas 251 and 252 are edge areas where the rectangular object, which is a moving object in the N+1 frame, shifts between frames.

Thus, since only the edge area with motion can be enhanced in the first embodiment, the sharpness of the moving picture displayed on the liquid crystal display 20 can be further improved. Then, the liquid crystal display 20 can exhibit a higher-quality moving picture to the viewer.

Here, the output value determined in the output value determination corresponds to the initial enhanced gray-scale level $L_e$, and the output value after the correction in the output value correction corresponds to the enhanced gray-scale level $L_c$. Further, the gate array 104 of the first embodiment performs the three steps according to an arithmetic expression.

Figure 12:
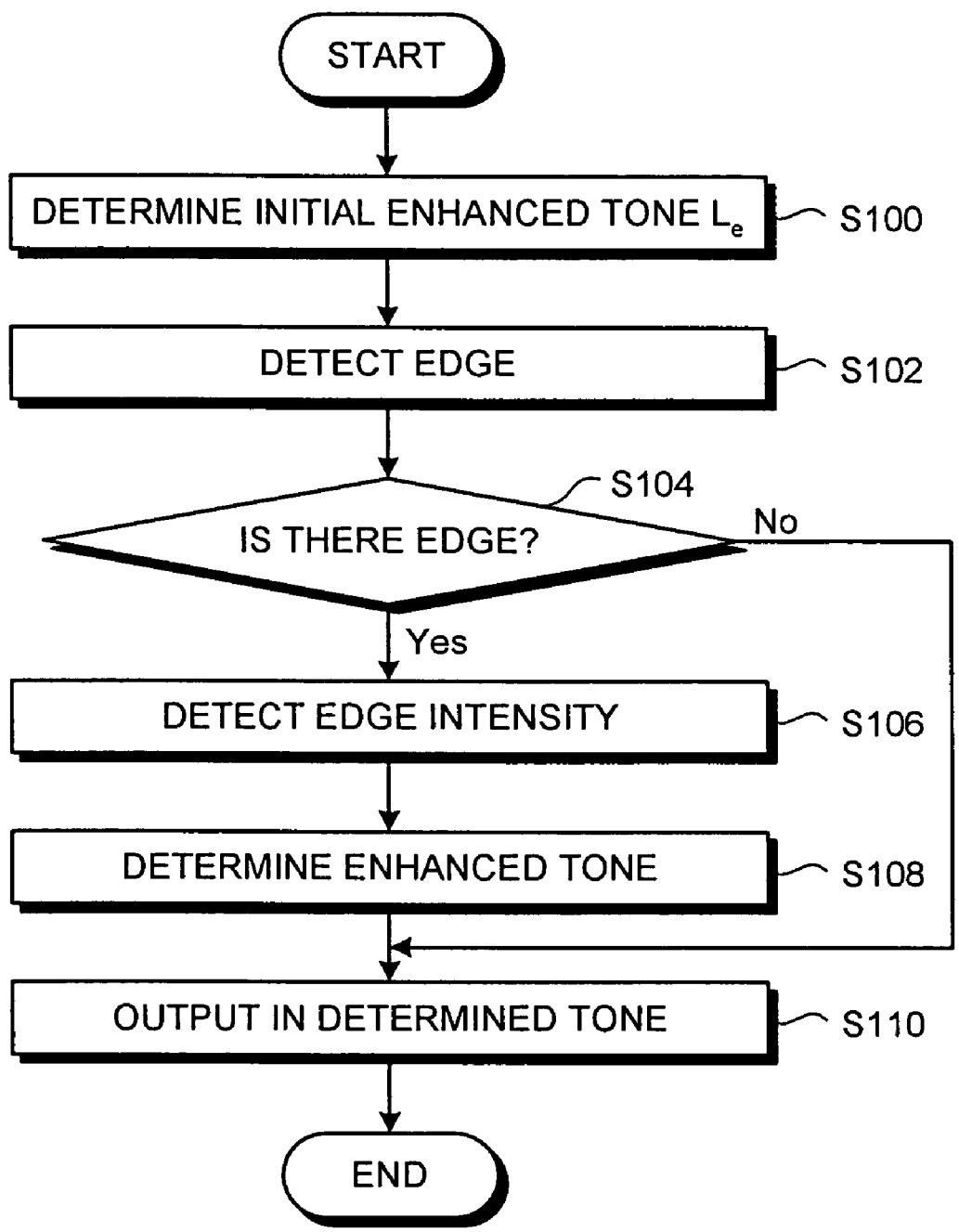
FIG. 12 is a flowchart of a moving picture processing in the moving picture processing apparatus according to the first embodiment.

FIG. 12 is a flowchart of a moving picture processing by the moving picture processing apparatus 10 according to the first embodiment. First, the gate array 104 determines the initial enhanced gray-scale level $L_e$ (step S100). Then, the edge detecting unit 102 detects an edge area (step S102). When the edge detecting unit 102 detects an edge area (Yes in step S104), the gate array 104 detects the edge intensity in the edge area (step S106). Then the gate array 104 determines the enhancement correction factor β based on the detected edge intensity and further determines the enhanced gray-scale level $L_c$ according to Expression (4) (step S108) Then the moving picture processing apparatus 10 supplies a picture in the determined enhanced gray-scale level $L_c$ as an output (step S110).

On the other hand, when the edge detecting unit 102 does not detect the edge area in step S104 (No in step S104), the moving picture processing apparatus 10 supplies a picture in the initial enhanced gray-scale level $L_e$ as an output (step S110).

Figure 13:
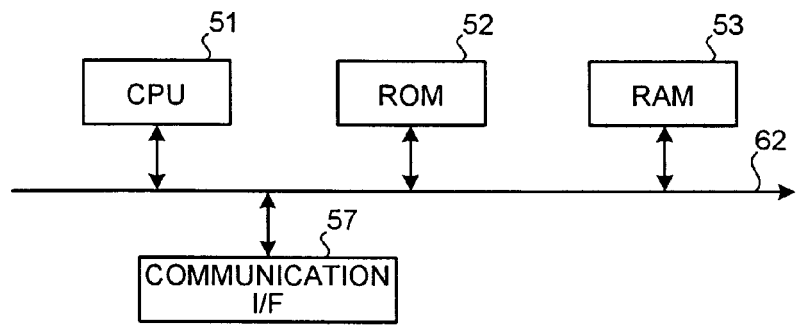
FIG. 13 is a diagram of a hardware structure of the moving picture processing apparatus according to the first embodiment.

FIG. 13 is a diagram of a hardware structure of the moving picture processing apparatus 10 according to the first embodiment. The moving picture processing apparatus 10 includes, as the hardware structure, an ROM 52 which stores a moving picture processing program or the like for the execution of moving picture processing in the moving picture processing apparatus 10, a central processing unit (CPU) 51 which controls respective parts of the moving picture processing apparatus 10 according to the program stored in the ROM 52, an RAM 53 which stores various necessary data for the control of the moving picture processing apparatus 10, a communication interface (I/F) 57 which realizes communication by connecting to a network, and a bus 62 which connects respective parts of the moving picture processing apparatus 10.

The moving picture processing program in the moving picture processing apparatus 10 mentioned above may be recorded on a computer-readable recording medium such as a CD-ROM, a floppy (registered trademark) disk (FD), and a digital versatile disc (DVD), in a installable or an executable file format for provision.

Then, the moving picture processing program may be read out from the recording medium on the moving picture processing apparatus 10 and executed as to be loaded on a main memory, whereby the respective units described above as a software structure are realized on the main memory.

The moving picture processing program of the first embodiment may be structured as to be stored on a computer connected to a network such as the Internet and downloaded via the network.

Next, the moving picture processing apparatus 10 according to a second embodiment is described. The moving picture processing apparatus 10 according to the second embodiment makes the liquid crystal display 20 display video information utilizing a display method disclosed in Japanese Patent Application Laid-Open No. 2003-264846.

Figure 14:
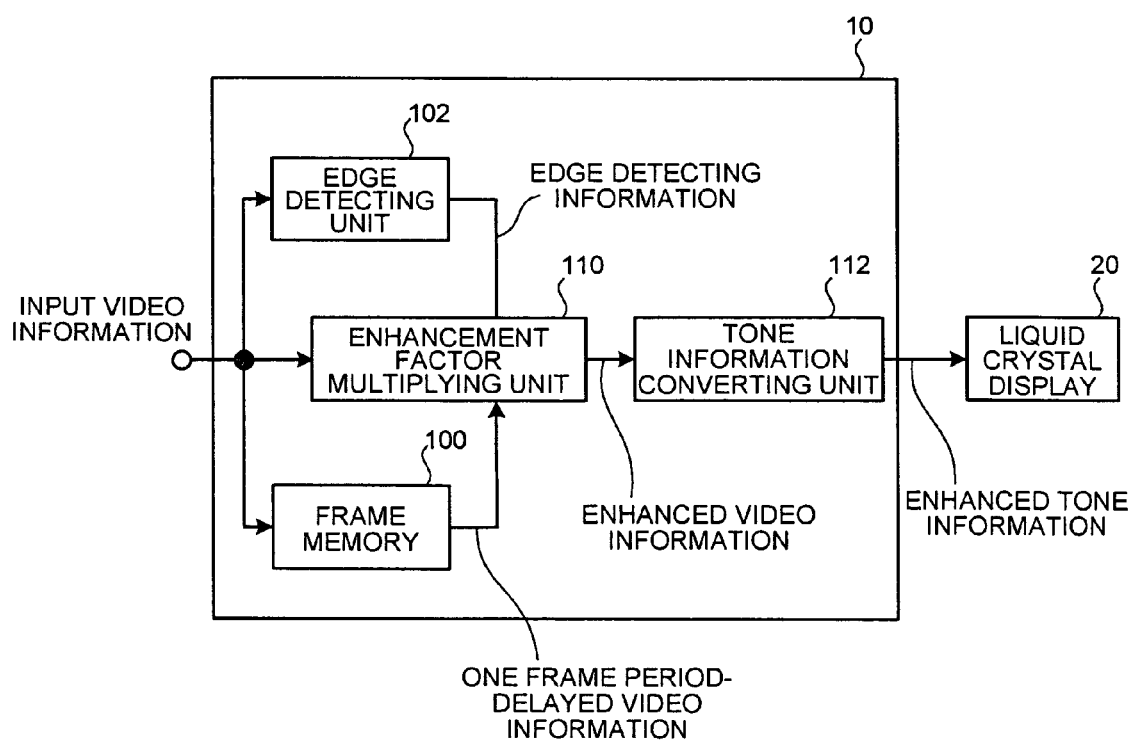
FIG. 14 is a block diagram of a functional structure of a moving picture processing apparatus according to a second embodiment.

FIG. 14 is a block diagram of a functional structure of the moving picture processing apparatus 10 according to the second embodiment. The moving picture processing apparatus 10 according to the second embodiment includes the frame memory 100, the edge detecting unit 102, an enhancement factor multiplying unit 110, and a gray-scale level information converting unit 112.

The input video information supplied to the moving picture processing apparatus 10 is further supplied to the frame memory 100, the edge detecting unit 102, and the enhancement factor multiplying unit 110. Here, the input video information contains luminance information (Y) and color-difference information (U, V).

The enhancement factor multiplying unit 110 calculates enhancement video information to be displayed on the liquid crystal display 20 based on the enhancement factor previously set based on the response delay of the liquid crystal display 20, the enhancement correction factor determined based on the edge intensity of the edge-detected picture detected by the edge detecting unit 102, and inter-frame difference values of the luminance information and the color difference information. Specifically, the enhancement factor multiplying unit 110 multiplies the enhancement correction factor with the inter-frame difference values of the luminance information and the color difference information. Further, the enhancement factor multiplying unit 110 adds luminance information and color difference information of a frame which is one frame period delayed by the frame memory 100, i.e., the first frame, to the obtained value. The resulting video information is supplied to the gray-scale level information converting unit 112 as the enhanced video information.

The enhancement factor multiplying unit 110 finds the enhanced video information according to Expression (9):

$$\begin{bmatrix} Y_c \\ U_c \\ V_c \end{bmatrix} = \alpha\beta \begin{bmatrix} Y_1 - Y_0 \\ U_1 - U_0 \\ V_1 - V_0 \end{bmatrix} + \begin{bmatrix} Y_0 \\ U_0 \\ V_0 \end{bmatrix} \quad (9)$$

Here, $(Y_0, U_0, V_0)$ represents luminance information and color difference information of the first frame, i.e., the input video information. $(Y_1, U_1, V_1)$ represents luminance information and color difference information of the second frame, i.e., video information which is one-frame period delayed. Further, a denotes the enhancement factor and β denotes the enhancement correction factor. Here, β is a real number not less than 1.

Figure 15:
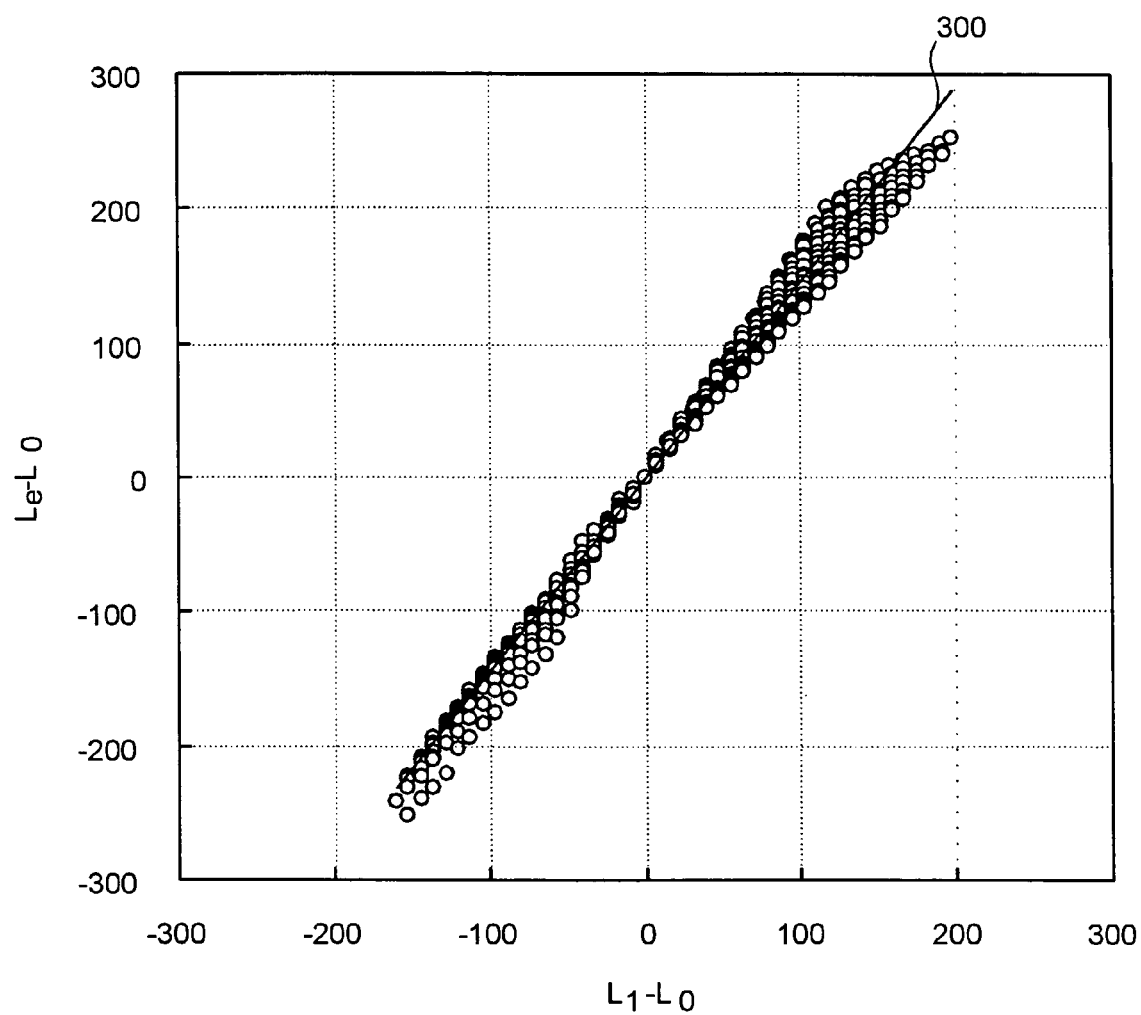
FIG. 15 is a graph of an approximate straight line found via plotting of each value along a horizontal axis $L_1-L_0$ and a vertical axis $L_e-L_0$ according to the least mean square error (LMS)

The enhancement factor a is determined based on the relation among the gray-scale level $L_0$ of the first frame, the gray-scale level $L_1$ of the second frame and the initial enhanced gray-scale level $L_e$ as described with reference to FIG. 2 according to the first embodiment. Specifically, the enhancement factor a is determined according to the least mean square error (LMS) method. As shown in FIG. 15, the values are plotted with the horizontal axis representing $L_1-L_0$ and the vertical axis representing $L_e-L_0$. A solid line 300 shown in FIG. 15 is an approximate straight line obtained from the plotting based on the LMS. The inclination of the approximate straight line is determined to be the enhancement factor a.

The enhancement correction factor β is calculated according to Expression (5) based on the edge intensity of the edge-detected picture similarly to the first embodiment. The enhancement correction factor β may be calculated according to one of Expressions (6) to (8) instead of Expression (5).

Alternatively, the enhancement factor multiplying unit 110 may find the enhanced video information according to Expression (10) instead of Expression (9):

$$\begin{bmatrix} Y_c \\ U_c \\ V_c \end{bmatrix} = (\alpha + \beta) \begin{bmatrix} Y_1 - Y_0 \\ U_1 - U_0 \\ V_1 - V_0 \end{bmatrix} + \begin{bmatrix} Y_0 \\ U_0 \\ V_0 \end{bmatrix} \quad (10)$$

where β is a real number not less than zero. Hence, β is found according to, for example, one of Expressions (11) to (14):

$$\beta = \frac{\beta_{max}}{255} \times I \quad (11)$$

$$\beta = \begin{cases} \frac{\beta_{max}}{255 - I_{Lth}} \times (I - I_{Lth}) + 1 & (I \geq I_{Lth}) \\ 1 & (I < I_{Lth}) \end{cases} \quad (12)$$

$$\beta = \begin{cases} \frac{\beta_{max}}{I_{Hth}} \times I & (I < I_{Hth}) \\ \beta_{max} & (I \geq I_{Hth}) \end{cases} \quad (13)$$

$$\beta = \begin{cases} 0 & (I < I_{Lth}) \\ \frac{\beta_{max}}{I_{Hth} - I_{Lth}} \times (I - I_{Lth}) & (I_{Lth} \leq I \leq I_{Hth}) \\ \beta_{max} & (I \geq I_{Hth}) \end{cases} \quad (14)$$

The gray-scale level information converting unit 112 converts the luminance information and the color difference information to enhanced gray-scale level information of three primary colors, and displays the enhanced gray-scale level information on the liquid crystal display 20. The gray-scale level information converting unit 112 converts the enhanced video information containing the luminance information and the color difference information to the enhanced gray-scale level information of three primary colors.

The liquid crystal display 20 realizes picture display by writing in gray-scale levels to sub-pixels corresponding to three primary colors, i.e., red, green, and blue. For the display, the information is converted to be suitable for the display method of the liquid crystal display 20. The gray-scale level information converting unit 112 converts information according to the matrix transformation represented by Expression (15):

$$\begin{bmatrix} R_c \\ G_c \\ B_c \end{bmatrix} = \begin{bmatrix} 0.257 & 0.504 & 0.098 \\ -0.148 & -0.291 & 0.439 \\ 0.439 & -0.368 & -0.071 \end{bmatrix}^{-1} \begin{bmatrix} Y_c \\ U_c \\ V_c \end{bmatrix} \quad (15)$$

where $(R_c, G_c, B_c)$ represent enhanced gray-scale levels of red, green, and blue, respectively. The matrix of 3×3 shown above is merely an example and other factors are also applicable.

Figure 16:
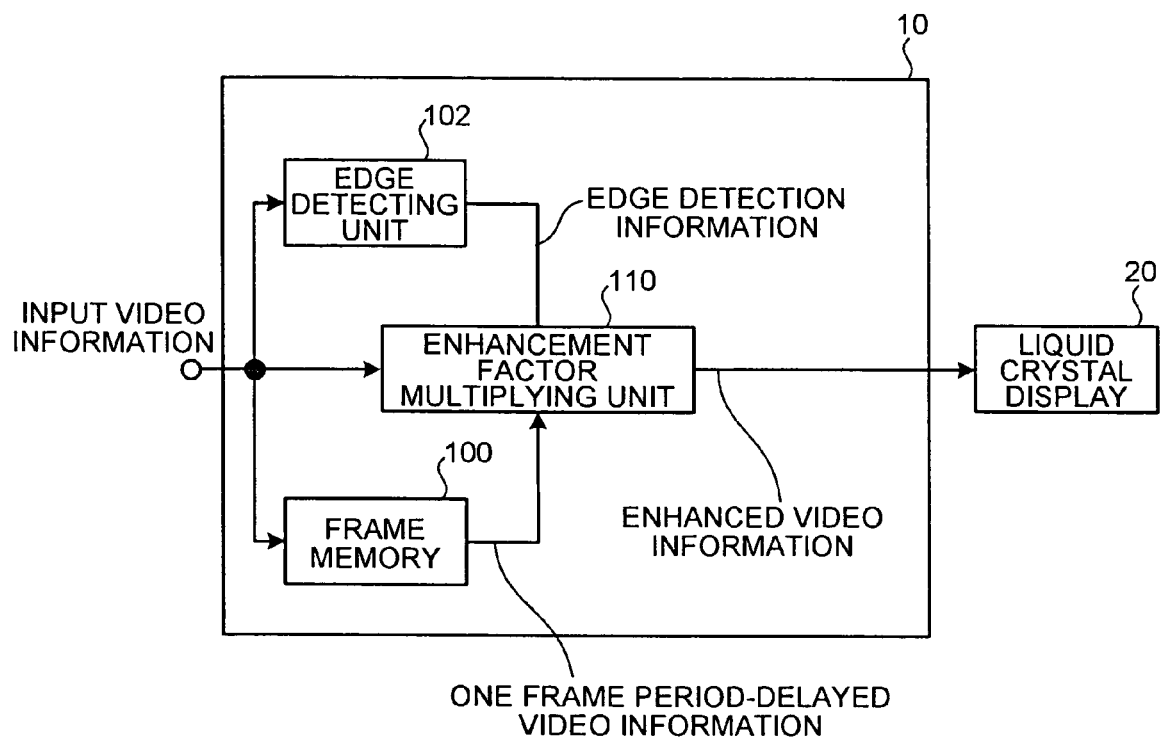
FIG. 16 is a block diagram of a functional structure of the moving picture processing apparatus when input video information includes three primary colors, i.e., red, green, and blue as diagram information.

In the above description, the input video information is described to be consisted of the luminance information (Y) and the color difference information (U,V). However, the input video information may be picture information on three primary colors, i.e., red, green, and blue. Then, the moving picture processing apparatus may be structured as shown in FIG. 16 so as not to include the gray-scale level information converting unit shown in FIG. 14. Further, Expression (9) may be rewritten as Expression (16):

$$\begin{bmatrix} R_{Rc} \\ G_c \\ B_c \end{bmatrix} = \alpha\beta \begin{bmatrix} R_1 - R_0 \\ G_1 - G_0 \\ B_1 - B_0 \end{bmatrix} + \begin{bmatrix} R_0 \\ G_0 \\ B_0 \end{bmatrix} \quad (16)$$

Here, $(R_1, G_1, B_1)$ represent picture information of three primary colors, red, green, and blue of the second frame, whereas $(R_0, G_0, B_0)$ represent picture information of three primary colors, red, green, and blue of the first frame. Further, $(R_c, G_c, B_c)$ represent enhanced picture information of three primary colors, red, green, and blue. Similarly, Expression (10) can be rewritten into Expression (17):

$$\begin{bmatrix} R_c \\ G_c \\ B_c \end{bmatrix} = (\alpha + \beta) \begin{bmatrix} R_1 - R_0 \\ G_1 - G_0 \\ B_1 - B_0 \end{bmatrix} + \begin{bmatrix} R_0 \\ G_0 \\ B_0 \end{bmatrix} \quad (17)$$

The structure and processing of the moving picture processing apparatus 10 according to the second embodiment are same with those of the moving picture processing apparatus 10 according to the first embodiment in other respects.

As described above, the moving picture processing apparatus 10 according to the second embodiment can realize the processing of video information as to improve the sharpness of the moving picture displayed on the liquid crystal display 20. Thus, the moving picture processing apparatus 10 can reproduce a high-quality moving picture to the viewer.

Next, the moving picture processing apparatus 10 according to a third embodiment is described. A basic structure of the moving picture processing apparatus 10 according to the third embodiment is same with the structure of the moving picture processing apparatus 10 according to the first embodiment.

In the moving picture processing apparatus 10 according to the third embodiment, the gate array 104 does not perform edge enhancement on a pertinent area when the absolute value of the inter-frame difference value between the first frame and the second frame is not more than a predetermined value. In this regard, the moving picture processing apparatus 10 according to the third embodiment is different from the moving picture processing apparatus 10 according to other embodiments.

In the first embodiment, the enhancement correction factor β in Expression (4) utilized by the gate array 104 is found based on Expression (5) described in the first embodiment.

In the gate array 104 according to the third embodiment, an enhancement correction factor β' is found via Expressions (18) and (19) on the enhancement correction factor β found via Expression (5).

$$\beta' = \begin{cases} 1 & (\Delta L \leq L_{th}) \\ \beta & (\Delta L > L_{th}) \end{cases} \quad (18)$$

$$\Delta L = \text{Abs}(L_1 - L_0) \quad (19)$$

where $L_{th}$ denotes a predetermined threshold, and Abs (x) denotes an absolute value of x. In the third embodiment, the enhanced gray-scale level $L_c$ is found according to Expression (20):

$$Lc = \beta'(L_e - L_1) + L_1 \quad (20)$$

Thus, when the inter-frame absolute difference of $L_1 - L_0$ is equal to or less than the threshold $L_{th}$, the enhancement correction factor β' is set to one and no over-enhancement is performed. When the enhancement correction factor β' is set to one when the inter-frame absolute difference of $L_1 - L_0$ is equal to or less than the threshold $L_{th}$, the over-enhancement of the noise component can be prevented.

The noise components in the picture may be detected as an edge by the edge detecting unit 102. In addition, the noise changes over time. Hence, in the moving picture processing apparatus 10 according to the first embodiment, noise may be detected as an edge portion of a moving object and over-enhanced.

Hence, in the moving picture processing apparatus 10 according to the third embodiment, when the inter-frame absolute difference of $L_1-L_0$ is equal to or less than the threshold $L_{th}$, the enhancement correction factor $\beta'$ is set to one and over-enhancement is not performed on an area where the change is minor as in an area of the noise. Thus the over-enhancement of the noise component in the picture can be prevented.

Though the threshold $L_{th}$ is desirably found based on the signal to noise ratio (S/N) of the input video information, generally it is sufficient to set the value of approximately ten as the threshold $L_{th}$.

The structure and processing of the moving picture processing apparatus 10 according to the third embodiment are same with those of the moving picture processing apparatus 10 according to the first embodiment in other respects.

Next, the moving picture processing apparatus 10 according to a fourth embodiment is described. A basic structure of the moving picture processing apparatus 10 according to the fourth embodiment is same with the structure of the moving picture processing apparatus 10 according to the second embodiment.

In the moving picture processing apparatus 10 according to the fourth embodiment, when the absolute values of the inter-frame difference value of the luminance information Y between the first frame and the second frame is not more than a predetermined value, the gate array 104 does not perform edge enhancement on a pertinent area similarly to the moving picture processing apparatus 10 according to the third embodiment.

The gate array 104 of the moving picture processing apparatus 10 according to the fourth embodiment finds an enhancement correction factor $\beta''$ by applying Expressions (21) and (22) on the enhancement correction factor $\beta$ found according to Expression (5):

$$\beta'' = \begin{cases} 1 & (\Delta Y \le Y_{th}) \\ \beta & (\Delta Y > Y_{th}) \end{cases} \quad (21)$$

$$\Delta Y = \text{Abs}(Y_1 - Y_0) \quad (22)$$

Further, when the enhanced video information is to be found according to Expression (10), the enhancement correction factor $\beta''$ is found according to Expression (23) instead of Expression (21):

$$\beta'' = \begin{cases} 0 & (\Delta Y \le Y_{th}) \\ \beta & (\Delta Y > Y_{th}) \end{cases} \quad (23)$$

In other words, when the over-enhancement is not performed, the enhancement correction factor represented by Expression (10) is zero. Hence, when $\Delta Y$ is not more than the threshold $Y_{th}$, $\beta$ is set to zero.

The structure and processing of the moving picture processing apparatus 10 according to the fourth embodiment are same with the structure and processing of the moving picture processing apparatus 10 according to the second embodiment in other respects.

As described above, the moving picture processing apparatus 10 according to the fourth embodiment can improve the sharpness of the moving picture displayed on the liquid crystal display 20. Hence, the moving picture processing apparatus 10 can reproduce a higher-quality moving picture to the viewer.

Next, the moving picture processing apparatus 10 according to a fifth embodiment is described. A basic structure of the moving picture processing apparatus 10 according to the fifth embodiment is same with the structure of the moving picture processing apparatus 10 according to the first to the fourth embodiments.

The moving picture processing apparatus 10 according to the fifth embodiment determines the enhanced gray-scale level according to a process different from the process performed according to other embodiments when a frame rate of the input video information is different from a refresh rate of the liquid crystal display. In this regard, the moving picture processing apparatus 10 according to the fifth embodiment is different from the moving picture processing apparatus 10 according to other embodiments.

Figure 17:
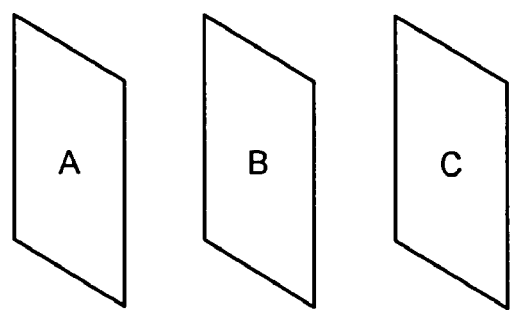
FIG. 17 is a diagram of a relation between a frame rate of an input image and a refresh rate of a liquid crystal display.
Figure 17:
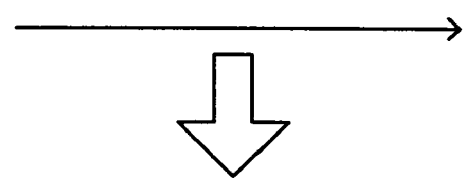
Figure 17:
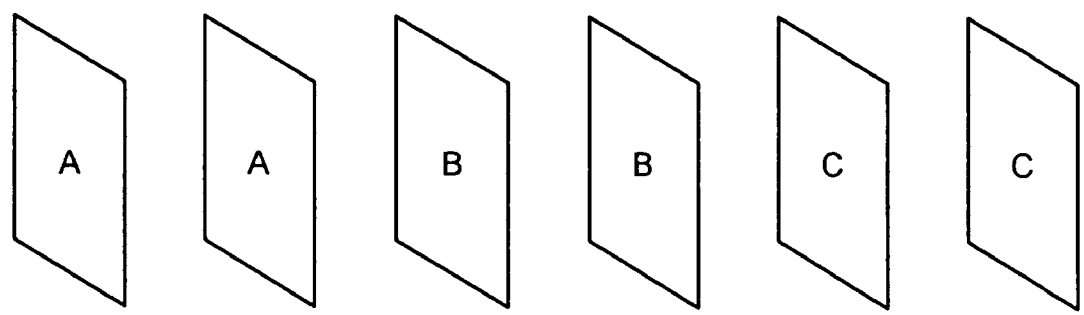
Figure 17:
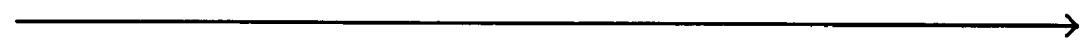

FIG. 17 is a diagram of a relation between the frame rate of the input picture and the refresh rate of the liquid crystal display 20. FIG. 17 shows input video information of 30 frames per second (fps). Specifically, FIG. 17 shows consecutive frames "A," "B," and "C." The horizontal axis is a time scale. The refresh rate of the liquid crystal display according to the fifth embodiment is set to 60 Hz. Then, when a sequence of input video information "A," "B," and "C" is supplied at 30 fps as shown in FIG. 17, the liquid crystal display 20 displays same frame twice every 1/60 second, so as to display "A," "A," "B," "B," "C," and "C" sequentially.

Hence, at the refresh timing of the liquid crystal display 20, the displayed frame is changed (e.g., from "A" to "B"), and not changed (e.g., from "B" to "B") alternately.

When the same frame is repeatedly displayed on the liquid crystal display 20 according to the same process as described in other embodiments, a flicker is generated.

For example, when a first "A" is written into the liquid crystal display 20 in an enhanced-gray-scale level, and a second "A" is written into in the initial enhanced gray-scale level, the frame written in the enhanced gray-scale level and the frame written in the initial enhanced gray-scale level are displayed in turn for every 1/60 second on the liquid crystal display 20. Hence, a flicker is generated at a cycle of 1/30 second.

Further, when the first "A" and the second "A" are written in the enhanced gray-scale level, the level of the displayed gray-scale level of the second "A" exceeds an appropriate gray-scale level level. In other words, over-enhancement occurs.

Hence in the moving picture processing apparatus 10 according to the fifth embodiment, at the second consecutive display of the same frame, a second enhanced gray-scale level $L_{ec}$ represented by Expression (24) is written into for an edge area to be enhanced.

$$L_{ec} = r(\beta-1)(L_e-L_1)+L_1 \quad (24)$$

Here, $L_{ec}$ denotes an edge-corrected gray-scale level in an edge-corrected frame. A factor r denotes the factor from 0 to 1. In Expression (24), the factor r is multiplied by an amount of over-enhancement represented as $(\beta-1)(L_e-L_1)$, to represent an attained gray-scale level with the addition of $L_1$ at the over-enhancement.

The factor r is a factor to correct the response delay of the liquid crystal display. When an over-enhanced gray-scale level represented by $(\beta-1)(L_e-L_1)$ is written into the liquid crystal display, due to the response delay of the liquid crystal display, the over-enhanced level of $(\beta-1)(L_e-L_1)$ cannot be actually achieved. Hence in the embodiment, factor of 0 to 1 is multiplied to correct to the actually attained level. Here, r is a value determined by the response characteristic of the liquid crystal display. The value of r may be calculated based on an actually measured value. The gate array 104 writes in a second enhanced gray-scale level $L_{ec}$ calculated according to Expression (24)

Figure 18:
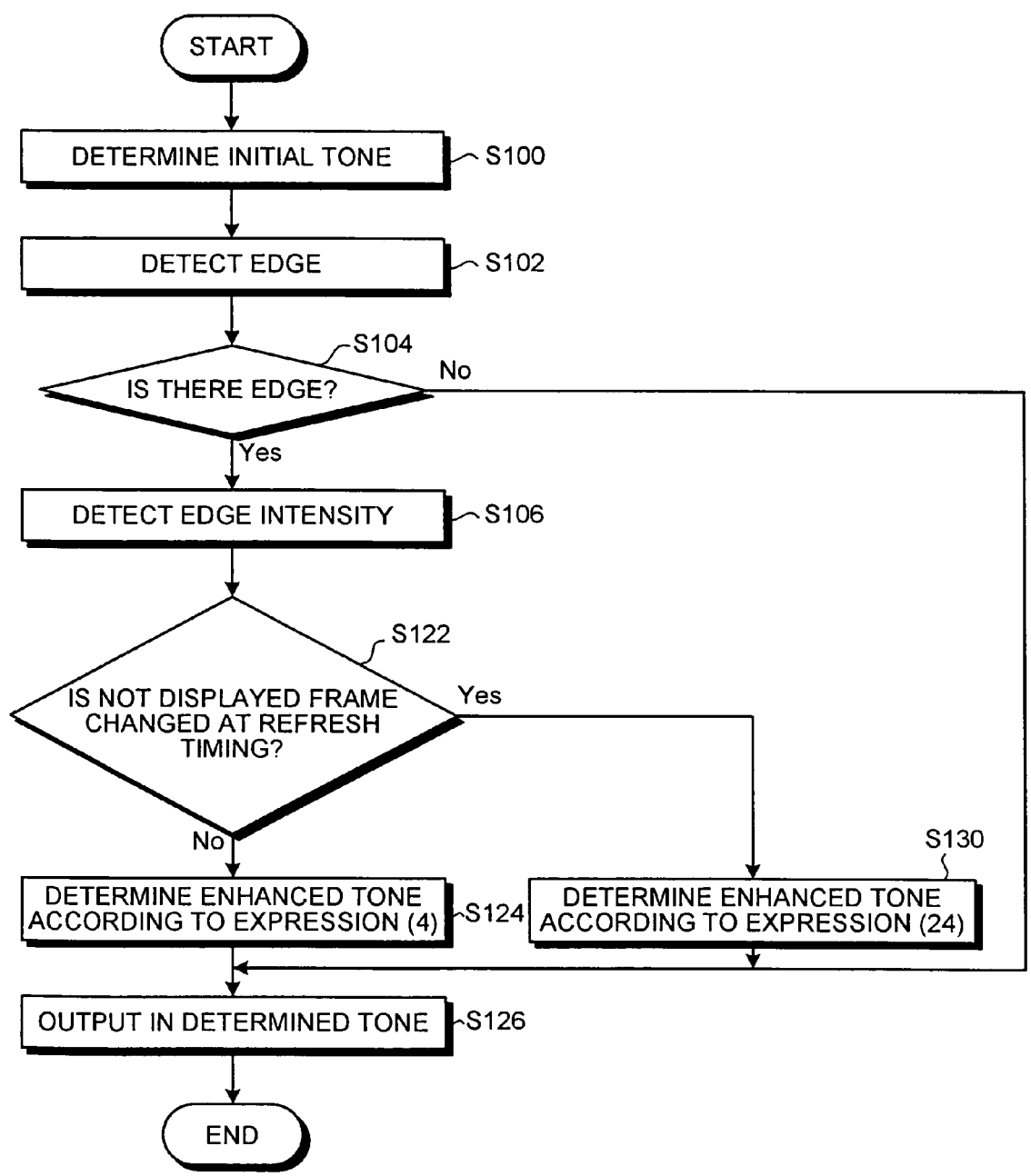
FIG. 18 is a flowchart of a moving picture processing by the moving picture processing apparatus according to a fifth embodiment.

FIG. 18 is a flowchart of a moving picture processing by the moving picture processing apparatus 10 according to the fifth embodiment. In the fifth embodiment, the gate array 104, after detecting the edge intensity in step S106, the gate array 104 detects the transition of the input frame at the refresh timing of the liquid crystal display. When the displayed frame is changed at the refresh timing of the liquid crystal display 20 (No in step S122), the gate array 104, similarly to the gate array 104 according to the first embodiment, determines the enhancement correction factor β based on the edge intensity and determines the enhanced gray-scale level $L_c$ according to Expression (4) (step S124). Then, the gate array 104 writes in the determined gray-scale level (step S126).

On the other hand, when the displayed frame is not changed at the refresh timing of the liquid crystal display 20 (No in step S122), the second enhanced gray-scale level $L_{ec}$ is determined according to Expression (24) mentioned above (step S130).

Thus, the moving picture processing according to the fifth embodiment finishes. The process steps other than those specifically described above are same with the process described according to the first embodiment with reference to FIG. 7 and denoted by the same reference character.

Alternatively, the second enhanced gray-scale level corresponding to the enhanced frame determined by Expression (9) according to the second embodiment is calculated according to Expression (25) instead of Expression (24):

$$\begin{bmatrix} Y_{ec} \\ U_{ec} \\ V_{ec} \end{bmatrix} = \beta \begin{bmatrix} Y_1 - Y_0 \\ U_1 - U_0 \\ V_1 - V_0 \end{bmatrix} + \begin{bmatrix} Y_0 \\ U_0 \\ V_0 \end{bmatrix} \quad (25)$$

where $(Y_{ec}, U_{ec}, V_{ec})$ represent luminance information and color difference information of the edge-corrected frame, respectively.

Expression (25) can be derived as described below. When the gray scale level attained in the liquid crystal display according to Expression (9) is represented as $(Y_x, U_x, V_x)$, the following equation holds:

$$\alpha\beta \begin{bmatrix} Y_1 - Y_0 \\ U_1 - U_0 \\ V_1 - V_0 \end{bmatrix} = \alpha \begin{bmatrix} Y_x - Y_0 \\ U_x - U_0 \\ V_x - V_0 \end{bmatrix} \quad (26)$$

When Expression (26) is solved for $(Y_x, U_x, V_x)$, Expression (25) is obtained.

Still alternatively, the second enhanced gray-scale level corresponding to the enhanced frame determined by Expression (10) according to the second embodiment is calculated via Expression (27) instead of Expression (24):

$$\begin{bmatrix} Y_{ec} \\ U_{ec} \\ V_{ec} \end{bmatrix} = \frac{\beta}{\alpha} \begin{bmatrix} Y_1 - Y_0 \\ U_1 - U_0 \\ V_1 - V_0 \end{bmatrix} + \begin{bmatrix} Y_1 \\ U_1 \\ V_1 \end{bmatrix} \quad (27)$$

Expression (27) can be derived as described below. When the gray-scale level attained in the liquid crystal display according to Expression (10) is represented as $(Y_x, U_x, V_x)$, the following equation holds:

$$(\alpha + \beta) \begin{bmatrix} Y_1 - Y_0 \\ U_1 - U_0 \\ V_1 - V_0 \end{bmatrix} = \alpha \begin{bmatrix} Y_x - Y_0 \\ U_x - U_0 \\ V_x - V_0 \end{bmatrix} \quad (27)$$

When Expression (28) is solved for $(Y_x, U_x, V_x)$, Expression (27) is obtained.

When the input video information is picture information of three primary colors, i.e., red, green, and blue, (Y,U,V) in Expressions (25) and (27) are replaced with (R,G,B) to find the gray-scale level of the edge-corrected frame $(R_{ec}, G_{ec}, B_{ec})$.

As described above, the sharpness of the moving picture displayed on the moving picture display can be improved in the moving picture processing apparatus according to the fifth embodiment. Thus, the moving picture processing apparatus can exhibit a high-quality moving picture to the viewer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A method of processing a moving picture comprising:
calculating a first difference value between a pixel value at a predetermined position in a first frame included in a moving picture and a pixel value at a corresponding position to the predetermined position in a second frame which is subsequent to the first frame in the moving picture;
determining an output value for an output of a picture at the predetermined position in the second frame based on the first difference value and a degree of response delay caused at a display of the moving picture by a liquid crystal display;
detecting an edge area from the second frame;
calculating an edge intensity in the edge area of the second frame;
calculating a second difference between the output value at the predetermined position in the second frame and the pixel value at the corresponding position to the predetermined position in the second frame; and
correcting the output value for the edge area so that an absolute difference between the output value for the edge area and a current output value is larger than a predetermined first correction amount, based on the first difference value and the edge intensity, wherein
correcting of the output value includes correcting the output value for the edge area by multiplying the second difference value with a first enhancement correction factor which is larger than one and which is determined based on the edge intensity, and by further adding the pixel value at the predetermined position in the second frame to a result of the multiplication with the second difference value and the first enhancement correction factor.

2. The method according to claim 1, wherein detecting of the edge area includes detecting an area with a motion between the first frame and the second frame among the edge areas, and correcting of the output value includes correcting the output value for the edge area with the motion so that the absolute difference between the output value and the current output value is larger by the first correction amount, when the output value to be corrected is the output value determined for the edge area with the motion.

3. The method according to claim 1, wherein detecting of the edge area includes detecting an edge area based on a luminance component at each position in the second frame.

4. The method according to claim 1, wherein
correcting of the output value includes correcting the output value for the edge area so that the absolute value of the first difference value is larger by the first correction amount which is determined based on the edge intensity.

5. The method according to claim 4, wherein correcting of the output value includes correcting the output value for the edge area so that the absolute value of the output difference value is larger by the first correction amount which is proportional to the edge intensity.

6. The method according to claim 1, wherein correcting of the output value includes correcting the output value for the edge area so that the absolute value of the output difference value is larger by the first correction amount which is determined based on the first difference value.

7. The method according to claim 6, wherein correcting of the output value includes correcting the output value for the edge area by multiplying the first difference value with an enhancement factor which is equal to or larger than one and which is determined based on the degree of response delay and with a first enhancement correction factor which is larger than one and which is determined based on the edge intensity, and by further adding the pixel value at the predetermined position in the first frame to a result of the multiplication with the enhancement factor and the first enhancement correction factor.

8. The method according to claim 7, wherein correcting of the output value includes correcting the output value for the edge area when the edge intensity is lower than a predetermined first edge intensity threshold, by setting a predetermined fixed value as the first enhancement correction factor and performing an operation using the first enhancement correction factor.

9. The method according to claim 7, wherein correcting of the output value includes correcting the output value for the edge area when the edge intensity is higher than a predetermined second edge intensity threshold, by setting a predetermined fixed value as the first enhancement correction factor and performing an operation using the first enhancement correction factor.

10. The method according to claim 6, wherein
correcting of the output value includes correcting the output value for the edge area by adding (1) an enhancement factor which is equal to or larger than one and which is determined based on the degree of response delay and (2) a first enhancement correction factor which is larger than zero and which is determined based on the edge intensity, by multiplying a result of the addition of the enhancement factor and the first enhancement correction factor with the first difference value, and by further adding the pixel value at the predetermined position in the first frame to a result of the multiplication with the first difference value.

11. The method according to claim 1, further comprising calculating a second difference value between the output value determined for the picture at the predetermined position in the second frame and the pixel value at the predetermined position in the second frame, wherein the correcting includes correcting the output value for the edge area so that an absolute value of the first difference value between the output value and the current output value is larger by the first correction amount which is determined based on the second difference value.

12. The method according to claim 11, wherein
correcting of the output value includes correcting the output value for the edge area by multiplying the second difference value with a first enhancement correction factor which is larger than one and which is determined based on the edge intensity, and by further adding the pixel value at the predetermined position in the second frame to a result of the multiplication with the first enhancement correction factor.

13. The method according to claim 12, wherein
correcting of the output value includes correcting the output value for the edge area when the edge intensity is lower than a predetermined first edge intensity threshold, by setting a predetermined fixed value as a first enhancement correction factor, by multiplying the second difference value with the first enhancement correction factor, and by further adding the pixel value at the predetermined position in the second frame to a result of the multiplication with the first enhancement correction factor.

14. The method according to claim 12, wherein correcting of the output value includes correcting the output value for the edge area when the edge intensity is higher than a predetermined second edge intensity threshold, by setting a predetermined fixed value as a first enhancement correction factor, by multiplying the second difference value with the first enhancement correction factor, and by further adding the pixel value at the predetermined position in the second frame to a result of the multiplication with the first enhancement correction factor.

15. The method according to claim 1, wherein
correcting of the output value includes correcting the determined output value for the edge area when the first difference value is larger than a predetermined threshold value.

16. The method according to claim 1, further comprising determining an output value calculation expression based on a combination of a first difference value and a third difference value at each of plural positions, by finding the combination of the first difference value and the third difference value for each of the plural positions, the first difference value being a difference value between the pixel value at the predetermined position in the first frame and the pixel value at the corresponding position to the predetermined position in the second frame, and the third difference value being a difference value between the output value which is determined based on the degree of response delay for the picture at the predetermined position in the second frame and the pixel value at the predetermined position in the first frame, wherein determining of the output value includes determining the output value based on the output value calculation expression.

17. The method according to claim 1, wherein determining of the output value includes determining an output value for each of three primary colors consisting of red, green, and blue, which are displayed on the liquid crystal display.

18. The method according to claim 1, wherein determining of the output value includes determining an output value for each of a luminance component and a color difference component of the second frame.

19. The method according to claim 1, further comprising:
outputting an output value for a same frame for plural times in succession to the liquid crystal display when the refresh rate is determined to be different from the frame rate of the moving picture,
comparing a refresh rate of the liquid crystal display and a frame rate of a moving picture to be processed by acquiring the refresh rate of the liquid crystal display, wherein
correcting of the output value includes correcting, when the output value for the second frame is output in succession, the output value which is output as an output for the second frame for a first time so that the absolute value of the output difference value at the pertinent position is larger by the first correction amount, when the absolute value of the output difference value at the pertinent position is larger by a second correction amount which is predetermined and smaller than the first correction amount, when an output value to be corrected is an output value to be output at or after a second output during the successive output of the output value of the second frame.

20. The method according to claim 19, further comprising calculating a second difference value between an output determined for the picture at the predetermined position in the second frame and the pixel value at the pertinent position in the second frame, wherein correcting of the output value includes correcting so that the absolute value of the output difference value at the pertinent position is larger by the second correction amount which is determined based on the second difference value, when the output value to be corrected is the output value to be output at or after the second output during the successive output of the output value of the second frame.

21. The method according to claim 19, wherein
correcting of the output value includes correcting so that the absolute value of the output difference value at the pertinent position is larger by the second correction amount which is determined based on the edge intensity, when the output value to be corrected is the output value to be output at or after the second output during the successive output of the output value of the second frame.

22. The method according to claim 19, wherein
correcting of the output value includes correcting so that the absolute value of the output difference value at the pertinent position is larger by the second correction amount which is determined based on the first difference value, when the output value to be corrected is the output value to be output at or after the second output during the successive output of the output value of the second frame.

23. The method according to claim 22, wherein
correcting of the output value includes correcting the output value for the edge area so that the absolute value of the output difference value at the pertinent position is larger by the second correction amount, when the output value to be corrected is the output value to be output at or after the second output during the successive output of the output value of the second frame, by multiplying the first difference value with a second enhancement correction factor which is larger than one and which is determined based on the edge intensity, and by further adding the pixel value at the predetermined position in the first frame to a result of the multiplication with the second enhancement correction factor.

24. The method according to claim 23, wherein correcting of the output value includes correcting the output value for the edge area so that the absolute value of the output difference value at the pertinent position is larger by the second correction amount, by performing an operation using the second enhancement correction factor which can be obtained by division of a first enhancement correction factor which is larger than one and which is determined based on the edge intensity by an enhancement factor which is larger than one and determined based on the degree of response delay.

25. The method according to claim 19, further comprising calculating a difference value between an output value for an output of a picture at the corresponding position to the predetermined position in the second frame and the pixel value at the pertinent position in the second frame, wherein correcting of the output value includes correcting so that the absolute value of the output difference value at the pertinent position is larger by the second correction amount determined based on the difference value, when the output value to be corrected is the output value to be output at or after the second output during the successive output of the output value of the second frame.

26. A moving picture processing apparatus comprising:
a first difference value calculator that calculates a first difference value between a pixel value at a predetermined position in a first frame included in a moving picture and a pixel value at a corresponding position to the predetermined position in a second frame which is subsequent to the first frame in the moving picture;
an output value determining unit that determines an output value for an output of a picture at the predetermined position in the second frame based on the first difference value and a degree of response delay caused at a display of the moving picture by a liquid crystal display;
an edge area detecting unit that detects an edge area from the second frame;
an edge intensity calculator that calculates an edge intensity in the edge area from the second frame;
a second difference value calculator that calculates a second difference between the output value at the predetermined position in the second frame and the pixel value at the corresponding position to the predetermined position in the second frame; and
an output value correcting unit that corrects the output value for the edge area so that an absolute difference between the output value for the edge area and a current output value is larger by a predetermined first correction amount, based on the first difference value and the edge intensity, wherein
the output value correcting unit corrects the output value for the edge area by multiplying the second difference value with a first enhancement correction factor which is larger than one and which is determined based on the edge intensity, and by further adding the pixel value at the predetermined position in the second frame to a result of the multiplication with the second difference value and the first enhancement correction factor.

27. A computer program product comprising a computer readable medium storing program instructions, which, when executed by a computer, cause the computer to perform the steps of:
calculating a first difference value between a pixel value at a predetermined position in a first frame included in a moving picture and a pixel value at a corresponding position to the predetermined position in a second frame which is subsequent to the first frame in the moving picture;

determining an output value for an output of a picture at the predetermined position in the second frame based on the first difference value, and a degree of response delay caused at a display of the moving picture by a liquid crystal display;

detecting an edge area from the second frame;

calculating an edge intensity in the edge area of the second frame;

calculating a second difference between the output value at the predetermined position in the second frame and the pixel value at the corresponding position to the predetermined position in the second frame; and correcting the output value for the edge area so that an absolute difference between the output value for the edge area and a current output value is larger by a predetermined first correction amount, based on the first difference value and the edge intensity, wherein correcting of the output value includes correcting the output value for the edge area by multiplying the second difference value with a first enhancement correction factor which is larger than one and which is determined based on the edge intensity, and by further adding the pixel value at the predetermined position in the second frame to a result of the multiplication with the second difference value and the first enhancement correction factor.

28. The computer program product according to claim 27, wherein determining of the output value includes determining the output value for the picture at the predetermined position in the second frame based on the first difference value and the degree of response delay.

29. The computer program product according to claim 27, wherein detecting of the output value includes detecting an area with a motion between the first frame and the second frame among the edge areas, and correcting of the output value includes correcting the output value for the edge area with the motion when the output value to be corrected is the output value which is determined for the edge area with the motion so that the absolute difference value between the output value and the current output value is larger by the first correction amount.

30. The computer program product according to claim 28, wherein correcting of the output value includes correcting the output value for the edge area by multiplying the first difference value with (1) an enhancement factor which is equal to or larger than one and which is determined based on the degree of response delay and (2) a first enhancement correction factor which is larger than one and which is determined based on the edge intensity, and by further adding the pixel value at the predetermined position in the first frame to a result of the multiplication with the enhancement factor and the first enhancement correction factor.

31. The computer program product according to claim 27, further comprising instructions of:

determining an output value calculation expression based on a combination of a first difference value and a third difference value at each of plural positions, by finding the combination of the first difference value and the third difference value for each of the plural positions, the first difference value being a difference value between the pixel value at the predetermined position in the first frame and the pixel value at the corresponding position to the predetermined position in the second frame, and the third difference value being a difference value between the output value which is determined based on the degree of response delay for the picture at the predetermined position in the second frame and the pixel value at the predetermined position in the first frame, wherein determining of the output value includes determining the output value based on the output value calculation expression.

32. The computer program product according to claim 27, further comprising instructions of:

outputting an output value for a same frame for plural times in succession to the liquid crystal display when the refresh rate is determined to be different than the frame rate of the moving picture, comparing a refresh rate of the liquid crystal display and a frame rate of a moving picture to be processed by acquiring the refresh rate of the liquid crystal display, wherein correcting of the output value includes correcting, when the output value for the second frame is output in succession, the output value which is output as an output for the second frame for a first time so that the absolute value of the output difference value at the pertinent position is larger by the first correction amount, when the absolute value of the output difference value at the pertinent position is larger by a second correction amount which is predetermined and smaller than the first correction amount, when an output value to be corrected is an output value to be output at or after a second output during the successive output of the output value of the second frame.

* * * * *